United States Patent [19]

Nanri et al.

[11] Patent Number: 5,202,073
[45] Date of Patent: Apr. 13, 1993

[54] PRODUCTION OF STRETCHED POLYMERIC MATERIAL HAVING HIGH STRENGTH AND HIGH MODULUS

[75] Inventors: Shosuke Nanri; Tokio Kawaguchi; Hiroshi Yasuda, all of Otsu, Japan

[73] Assignee: Toyo Boseki Kabushiki Kaisha, Osaka, Japan

[21] Appl. No.: 647,684

[22] Filed: Jan. 28, 1991

Related U.S. Application Data

[63] Continuation of Ser. No. 519,315, May 8, 1990, abandoned, which is a continuation of Ser. No. 341,296, Apr. 21, 1989, abandoned, which is a continuation of Ser. No. 135,545, Dec. 18, 1987 abandoned, which is a continuation of Ser. No. 925,481, Oct. 28, 1986, abandoned, which is a continuation of Ser. No. 640,635, Aug. 15, 1984, abandoned.

[30] Foreign Application Priority Data

Aug. 15, 1983 [JP] Japan .................................. 58-149437
Aug. 19, 1983 [JP] Japan .................................. 58-152261

[51] Int. Cl.$^5$ .......................... B29C 47/12; D01D 5/12
[52] U.S. Cl. .............................. 264/210.6; 264/210.8; 264/290.5; 264/291; 428/167
[58] Field of Search ............... 264/210.8, 210.6, 290.5, 264/291

[56] References Cited

U.S. PATENT DOCUMENTS 2,327,460  8/1943  Rugeley .......................... 264/210.8
2,721,785 10/1955  Zybert et al. .................... 264/210.8

Primary Examiner—Jacob Ziegler
Attorney, Agent, or Firm—Jones, Tullar & Cooper

[57] ABSTRACT

A method for preparing a stretched polymeric material of high strength and high modulus which comprises shaping a dilute solution of a synthetic polymer having an average molecular weight of not less than $3 \times 10^5$, followed by cooling to make a gel-like filament or film, and stretching the resultant gel-like filament or film at a high stretch ratio, characterized in that a solution or dispersion of (a) the gel-like globules of said synthetic polymer having the solvent occluded therein or (b) the fine powders of said synthetic polymer having an average particle weight of not more than $5 \times 10^{-5}$ mg per particle in a solvent is used as or for preparation of said polymer solution to be shaped.

11 Claims, 2 Drawing Sheets

PRODUCTION OF STRETCHED POLYMERIC MATERIAL HAVING HIGH STRENGTH AND HIGH MODULUS

This is a continuation of co-pending application Ser. No. 07/519,315 filed on May 8, 1990 now abandoned which is a continuation of co-pending application Ser. No. 07/341,246 filed on Apr. 21, 1989, now abandoned, which is a continuation of co-pending application Ser. No. 07/135,545 filed on Dec. 18, 1987, now abandoned, which is a continuation of co-pending application Ser. No. 925,481 filed on Oct. 28, 1986, which is a continuation of application Ser. No. 640,635, filed on Aug. 15, 1984, now both abandoned.

The present invention relates to production of a stretched polymeric material having high strength and high modulus. More particularly, it relates to an improved method for production of a stretched polymeric filament or film of high strength and high modulus through a gel-like shaped product.

Recently, there has been developed a method for manufacture of stretched filaments or films which comprises subjecting a solution of a synthetic polymer in a solvent to spinning or film-forming, followed by cooling to give a gel-like filament or film containing the solvent, and stretching the gel-like filament or film at a high stretch ratio (cf. European Patent 77590; U.S. Pat. Nos. 4,344,908, 4,413,110, 4,422,993 and 4,430,383). This method will be hereinafter referred to as "gel shaping method".

The gel shaping method is quite meritorious in imparting remarkably high strength and high modulus to the resulting stretched filaments or films. The problem in this method is the difficulty in preparation of a homogenous polymer solution having a desired polymer concentration to be shaped. For preparation of such polymer solution, a mixture of a synthetic polymer and a solvent is usually agitated at such a high temperature as almost the decomposition temperature of the polymer over a long period of time. As a result, the decomposition of the polymer may be caused. Further, the polymer used in the method has a ultra-high (very high) molecular weight, and its dispersing or dissolving in a solvent to give a homogeneous solution is quite difficult. Furthermore, the use of the polymer of ultra-high molecular weight makes the produced polymer solution highly viscous so that the production of bubbles during the agitation is unavoidable. The presence of undissolved polymer and produced bubbles in the polymer solution as well as the non-uniformity of the polymer solution prevents the smooth shaping of the polymer solution into filaments or films and causes the deterioration of the shaped filaments or films in quality.

In order to overcome the drawbacks as seen in the conventional gel shaping method, an extensive study has been made. As 1 result, it has been found that a homogeneous solution or dispersion of the polymer to be shaped can be prepared readily by mixing the gel-like globules of a synthetic polymer occluding a solvent therein or the fine powders of said crystalline synthetic polymer in a solvent. It has also been found that the use of such homogeneous polymer solution or dispersion can solve the problem in the conventional gel shaping method. This invention is based on these findings.

According to the present invention, there is provided a method for preparing a stretched filament or film of high strength and high modulus which comprises shaping a solution of a synthetic polymer of not less than $3 \times 10^5$ in average molecular weight, followed by cooling to make a gel-like filament or film and stretching the resultant gel-like filament or film at a high stretch ratio, characterized in that the solution or dispersion of (a) the gel-like globules of the synthetic polymer occluding a solvent therein or (b) the fine powders of the synthetic polymer having an average particle weight of not more than $5 \times 10^{-5}$ mg in a solvent is used as or for preparation of the polymer solution to be shaped.

The present invention provides an improvement in the conventional gel shaping method. More specifically, this invention is directed to the use of a certain specific solution or dispersion of a synthetic polymer as or for preparation of the polymer solution to be shaped. Namely, a synthetic polymer is once dissolved in a solvent for the polymer, and the resultant solution is then cooled to give gel-like globules occluding the solvent therein. Alternatively, a synthetic polymer is made to fine powders, for instance, by dissolving the polymer in a solvent, cooling the resultant solution and eliminating the solvent therefrom. Such gel-like globules or fine powders can be uniformly dissolved or dispersed in a solvent with ease, and the resulting solution or dispersion may be subjected to the step of shaping, i.e. spinning or film-forming, in the conventional gel shaping method.

The synthetic polymer to be used in this invention may be any crystalline synthetic polymer having an average molecular weight of not less than $3 \times 10^5$, which can be shaped into filaments or films in a gel-like state. Specific examples are polyolefins (e.g. polyethylene, polypropylene, ethylene/propylene copolymer), polyalkylene oxides (e.g. polyoxymethylene, polyethylene oxide), polyacrylonitrile, polyvinylidene fluoride, polyvinyl alcohol, polyamides, polyesters (e.g. polyethylene terephthalate, polybutylene terephthalate), etc. A higher average molecular weight is better in affording higher strength and higher modulus. A preferred average molecular weight is not less than $3 \times 10^5$. Particularly when the polymer is any of polyethylene, polypropylene, polyvinyl alcohol and polyacrylonitrile, an average molecular weight of not less than $3 \times 10^5$, especially of not less than $1 \times 10^6$, is favorable.

The solvent to be used for preparation of the gel-like globules or the fine powders and for preparation of their solution or dispersion to be shaped may be anyone which can dissolve the polymer at an elevated or high temperature but not at a lowered or low temperature. The solvent to be used for preparation of the solution or dispersion to be shaped is not necessarily required to be the same as used on preparation of the gel-like globules or the fine powders, although the same is usually favorable. The kind of solvent may be appropriately chosen depending upon the kind of polymer. When, for instance, the polymer is a polyolefin (e.g. polyethylene, polypropylene), there may be used as the solvent an aliphatic, alicyclic, aromatic, linear or branched hydrocarbon having a boiling point of not lower than 100° C., a petroleum distillation fraction having a boiling point of not lower than 100° C. or the like. Specific examples are octene, nonane, decane, undecane, dodecane, toluene, xylene, naphthalene, tetralin, decalin, etc. Halogenated hydrocarbons and other solvents are also usable. When the polymer is a polyacrylonitrile, there may be used dimethylformamide, dimethylsulfoxide, etc. as the solvent. When the polymer is polyvinyl alcohol, bis-beta-aminoethylamine, glycerol, etc. are usable as the solvent. Still, the solvent may be a single kind of low molecular weight compound or a mixture of two or more kinds of low molecular weight compounds.

Explaining the preparation of the gel-like globules (a) more in detail, a synthetic polymer in a powdery state is added to a solvent. The solvent may be the one as hereinabove explained, i.e. the one which can dissolve the polymer therein at an elevated temperature but not at a lowered temperature. The elevated temperature should be lower than the decomposition temperature of the polymer. The lowered temperature may be, for instance, room temperature. The amount of the polymer to be added to the solvent almost corresponds to the polymer concentration of the polymer solution to be shaped, usually about 1 to 10% by weight. After the addition, the resultant mixture is heated to a higher temperature but not causing the decomposition of the polymer and agitated by the aid of an agitator such as a homomixer so as to make the polymer dissolved in the solvent. With the progress of the dissolving, the solution becomes viscous. When, for example, polyethylene powder of high molecular weight (e.g. about $1 \times 10^6$ or more in average molecular weight) and decalin are used respectively as the polymer and as the solvent, the temperature is elevated from room temperature to about 160° C. in about 1 hour while agitating and then agitating is continued slowly at 160° C. for about 1 hour, whereby the polymer is dissolved in the solvent. As understood from this example, a long period of time is not needed for dissolving the polymer in the solvent on preparation of the gel-like globules. It is unfavorable to accomplish the dissolving at a high temperature for a long time, because the decomposition of the polymer is caused.

For preparation of the gel-like globules, it is important to carry out the cooling of the above prepared polymer solution as gradually or slowly as possible. By such cooling manner, fine globules are obtainable. The fine globules have usually 1 mm or less in average particle size and can be readily dissolved in the solvent by the aid of a conventional agitation apparatus such as a homomixer to give a homogenous solution. When the cooling is effected quickly, the gel-like product is rather film-like or paste-like, and fine globules of not more than 1 mm are hardly obtainable. Film-like or paste-like products can hardly afford a homogeneous solution and may cause the breakage of filaments or films on their preparation by shaping and also the deterioration of filaments and films in quality.

Said gradual or slow cooling of the polymer solution may be achieved in a spontaneous manner, i.e. by simply allowing such polymer solution to stand at room temperature overnight, whereby fine gel-like globules of not more than 1 mm in average diameter can be obtained. The gradual or slow cooling may be also achieved in a stepwise manner; e.g. the polymer solution at an elevated temperature is allowed to cool at two or more stages, of which each stage is set at a certain temperature lower than the elevated temperature and lower than the temperature of the foregoing or previous stage, for a certain period of time. This stepwise cooling is more favorable than the spontaneous cooling in affording desired fine gel-like globules within a shorter period of time.

The gel-like globules occluding the solvent therein consist of monoglobular gel-like particles or their mixture with polyglobular gel-like particles. Each of polyglobular gel-like particles is a collective body of two or more monoglobular gel-like particles. The gradual or slow cooling is quite effective for obtaining gel-like globules having a larger proportion of monoglobular gel-like particles. For simpler and easier preparation of the polymer solution to be shaped, it is favorable that the gel-like globules have a greater proportion of monoglobular gel-like globules; usually the gel-like globules shall contain monoglobular gel-like particles in an amount of not less than 50% by weight, particularly in an amount of not less than 70% by weight.

In general, the gel-like globules show a better solubility in a solvent when the average particle size is from 10 to 200 μm, particularly from 50 to 100 μm. Measurement of the particle size may be carried out by observation with a conventional microscope; for instance, the particle size of each of the gel-like globules as sampled at random is measured microscopically, and the average particle size is calculated on the basis of the observation of 50 or more gel-like globules.

As stated above, a smaller content of polyglobular gel-like particles in the gel-like globules is favorable in view of the solubility in the solvent. Since, however, polyglobular gel-like particles as the collective bodies of not more than 20 monoglobular gels, particularly of not more than 10 monoglobular gels, have a good solubility next to monoglobular gel-like particles themselves, the presence of such polyglobular gel-like particles does not cause any substantial problem in solubility and is thus permissible. On the other hand, the presence of polyglobular gel-like particles as the collective bodies of more than 20 monoglobular gels is not favorable, and when their proportion is too large, they are to be eliminated by an appropriate procedure. Monoglobular gel-like particles show a Maltese cross on observation with a polarizing microscope and therefore can be readily recognized.

In order to obtain the fine powders (b), the polymer should be made in a very fine powder form, each particle having a weight of not more than $5 \times 10^{-5}$ mg, particularly of not more than $3 \times 10^{-5}$ mg in average. The average weight of each particle of the fine powders may be determined by weighing the starting fine powders as sampled at random and measuring the number of the particles therein. When the average particle weight is more than $5 \times 10^{-5}$ mg, the fine powders may be uniformly dispersed but can not afford a satisfactorily homogeneous solution. For instance, the dispersion supplied in the hopper of an extruder can not be readily converted into a homogeneous solution unless heating for a long period is applied. Further, a portion of the powders may be easily sedimented on the inner surface of the extruder of a shaping machine, whereby the operation stability and the quality of the product are markedly lowered. In case of using the fine powders of not more than $5 \times 10^{-5}$ mg in average particle weight, said defects are not produced.

For preparation of the fine powders, the polymer may be once dissolved in a solvent of the kind as hereinabove explained, i.e. the one which can dissolve the polymer therein at an elevated temperature but not at a lowered temperature, and the resulting solution is then cooled gradually or slowly to make gel-like globules, preferably monoglobular gel-like particles containing the solvent. The gel-like globules are then lyophilized to give fine particles of desired average particle weight.

The solution or dispersion of the gel-like globules (a) or the fine particles (b) in the solvent to be shaped may be prepared by adding them to the solvent so as to make a desired concentration of the polymer and agitating the resultant mixture by the aid of a conventional agitation apparatus such as a homomixer to make a homogeneous solution or dispersion. On dissolving or dispersing, any additive such as a solubilizing or dispersing aid may be used. But, the amount of such additive should be so controlled that the physical properties (e.g. strength, elasticity) of the ultimately produced stretched filaments or films are not substantially deteriorated.

The concentration of the polymer in the polymer solution or dispersion may be appropriately adjusted by the trial-and-error procedure. Usually, the following three factors afford an influence on the polymer concentration: (1) the interaction between the polymer and the solvent; (2) the molecular weight of the polymer; and (3) the temperature at shaping. When the solvent has a higher solubility, the optimum polymer concentration for shaping may be higher. When the molecular weight of the polymer is larger, the optimum polymer concentration for shaping is smaller. When, for instance, the polymer is polyethylene, the polymer concentration may be from about 1 to 15% by weight, preferably from about 2 to 10% by weight, more preferably from about 2 to 5% by weight.

The thus prepared solution or dispersion is then charged into a shaping machine such as a spinning machine or a film-forming machine. For instance, the solution or dispersion may be supplied to an extruder type spinning or molding machine and then converted into a solution by heating in the extruder. Further, the solution may be supplied to an extruder from a dissolving vessel where the dissolution is conducted at a fixed concentration. In any event, the conversion of the dispersion into a solution as well as the maintenance of the solution state can be attained easily by heating within a short period of time, because the gel-like globules or the fine powders as mentioned above show good solubility or dispersibility. Usually, the dispersion is kept at a temperature lower than the temperature at which the polymer is not denatured, preferably at room temperature, and then heated in the extruder to make the solution state. The temperature at which the polymer is not denatured means a temperature at which the gel-like globules or the fine powders in their solution are partly agglomerated so that the homogeneous solution changes to the non-homogeneous dispersion.

The resultant solution is then shaped into an appropriate form. For instance, it may be spun through a spinneret to make a filament in a solution state, and the resulting filament is as such cooled with a cooling medium such as a cooling gas or a cooling liquid to give a gel-like filament containing the solvent. This gel-like filament is then taken up with or without stretching. Likewise, film-forming may be carried out to make a gel-like film containing the solvent.

The temperature on shaping of the polymer solution is usually between a temperature at which the polymer is decomposed or the solvent is boiled and a temperature at which the phase separation or gellation of the polymer solution takes place.

The thus shaped gel-like filament or film which contains a large amount of the solvent may be subjected immediately to stretching or once taken up on a take-up roll and then subjected to stretching. In the latter case, the gel-like filament or film is preferred to be provisionally stretched at least once prior to taking up. Such provisional stretching may be effected with a stretch ratio of at least about 2, preferably from 3 to 20, by the use of a heating plate or the like. During this provisional stretching, a considerable amount of the solvent contained in the shaped product is eliminated partly by evaporation and partly by squeezing. Usually, the gel-like filament or film before the provisional stretching contains the solvent in an amount of not less than about 90% by weight, while that after the provisional stretching contains the solvent in an amount of not more than about 60% by weight, preferably of not more than about 50% by weight. As 1 result of said provisional stretching, the gel-like filament or film shows a good releasing property when it is reeled off and subjected to principal stretching in the subsequent step. Further, the provisional stretching stabilizes the structure of the gel-like filament or film so that the take-up for a long period of time becomes possible. When the provisional stretching is not carried out, the gel-like filament or film as once taken up and then reeled off has an inferior releasing property and may produce breakage in the subsequent step for principal stretching.

As a result of stretching, there is obtained a stretched filament or film of high strength and high modulus.

By the above method, the homogeneous solution or dispersion of the polymer for shaping can be prepared without any substantial depression of the molecular weight of the polymer. Also, the gel-like filament or film as well as the stretched filament or film can be continuously prepared with a stable operation and without breakage over a long period of time. The stretched filament or film of high quality is thus obtainable with a high productivity. Since the polymer solution or dispersion to be shaped can be supplied to an extruder usually at room temperature without any heating, the method of this invention is quite meritorious in handling and economy.

As stated above, the stretched filament or film as prepared by the method of this invention has high strength and high modulus. For instance, the filament has usually a sectional flattness of not less than 1.7. On the surface of the filament made of polyethylene, there are present a number of grooves extended in lengthwise or axis direction. In usual cases, the tensile strength and initial modulus of the filament made of polyethylene are respectively not less than 30 g/d and not less than 800 g/d, which are extremely higher than the values of conventional polyethylene filaments. Thus, the filament of the invention is much improved in processability. When, for instance, the stretched filaments of the invention are used to make a rope as an industrial material, the resulting rope can have a smaller diameter and a smaller weight but a higher strength in comparison with a rope made of conventionally stretched filaments.

As above mentioned, the stretched filament of the invention can usually have a sectional flatness of not less than 1.7. Because of such great sectional flatness, the bundling property is much improved so that the packing property between or among the stretched filaments as twisted is greatly enhanced. When the sectional flatness is less than 1.7, the improvement in bundling property is not remarkable. The term "flatting rate (Ud)" as hereinabove used is intended to mean the value as calculated by the following formula:

$$Ud = a/b$$

wherein a (mm) is the length of the long axis in the cross section at a right angle to the filament axis and b (mm) is the length of the short axis.

At the surface of the stretched filament, at least two extended grooves are present per 10 μm of average distance in the circumferential direction of the cross section. These grooves are effective in decreasing the waxy feeling, enhancing the transportation of water and lowering the friction coefficient at the surface of the stretched filament.

Practical and presently preferred embodiments of the invention are illustratively shown in the following examples, wherein part(s) and % are by weight unless otherwise indicated.

Measurement of the tensile strength and initial modulus of the filament was carried out as follows:

Using a tensilon tester manufactured by Toyo-Baldwin, the S-S curve of a monofilament was determined under the following conditions: specimen length (gauge length), 30 mm; stretching speed, 100%/min. The tensile strength (g/d) and the initial modulus (g/d) were calculated therefrom. Calculation of the initial modulus was made from the maximum inclination around the original point of the S-S curve. Each of the above characteristic values is indicated by the average of at least 20 monofilaments.

EXAMPLE 1

Powders of polyethylene (viscosity average molecular weight, $2 \times 10^6$; average particle weight, $1.32 \times 10^{-2}$ mg) were added to decalin to make a polyethylene content of 3%, and the resultant mixture was stirred at 60 rpm for 40 minutes, during which the temperature was elevated up to 160° C. Around 120° C., the viscosity of the mixture rapidly increased due to dissolution of polyethylene, and the speed of stirring was diminished to 1/10 of the initial one. Then, stirring was continued at 160° C. for 1 hour to obtain a decalin solution of polyethylene.

The decalin solution was allowed to stand overnight, whereby a gel-like material was produced. The gel-like material contained some coarse particles in a film or particlulate form of more than 1 mm in average particle size but almost all of them could be separated into fine gel-like globules of 1 mm or less in average particle size by simple mechanical stirring. Fine gel-like globules of 1 mm or less in average particle size were collected and stirred in a homomixer. Microscopic observation revealed that the gel-like globules comprise about 80% of monoglobular gel-like particles and about 20% of polyglobular gel-like particles of which each is a collective body of 2 to 10 monoglobular gel-like particles. Each of the monoglobular gel-like particles comprised about 8% of polyethylene and 92% of decalin.

The thus obtained decalin-occluding fine gel-like globules were added to decalin to make a polyethylene content of 3%, and stirring was effected at room temperature by the use of a homomixer to obtain a uniform dispersion of fine gel-like globules.

The uniform gel dispersion was supplied at room temperature to the extruder hopper of a conventional gel-filament spinning apparatus (substantially the same as a conventional melt spinning apparatus) equipped with a screw-type extruder, of which the extruder was kept at 150° C., and then extruded through a spinneret having 40 orifices, each orifice having a diameter of 0.8 mm and a length of 8 mm, with an extrusion rate of 46 g/min to make filaments. The temperatures of the spinning head and of the spinneret were respectively 156° C. and 150° C. The extruded filaments were cooled beneath the spinneret by blowing air thereto at a speed of 0.4 m/sec to obtain gel-like filaments which contain decalin. The gel-like filaments were contacted onto a hot plate having a slit in the vertical direction provided under the spinneret and stretched provisionally at 110° C. with a stretch ratio of 6, followed by taking up onto bobbins.

The above spinning operation was continued for 60 hours but no filament breakage was produced. The spinning processability was very good.

The gel-like filaments were then subjected to stretching, i.e. first stretching at 135° C. with a stretch ratio of 4 while running in contact with a hot plate having a slit and second stretching at 150° C. with a stretch ratio of 2 while running as above. Thus, stretching of the gel-like filaments was made with a total stretch of 48 through the provisional, first and second stretching.

The gel-like filaments as obtained by continuous spinning over a period of 60 hours were stretched in the above manner, during which their dewinding from the bobbins was carried out smoothly and no filament breakage was observed. The stretching processability was thus excellent.

The stretched filaments as thus prepared showed a tensile strength of 46 g/d, an initial modulus of 1400 g/d and a break elongation of 5%. Little denier unevenness was observed among monofilaments and in the direction of filament axis. Any material depression in the molecular weight of polyethylene was not observed.

BRIEF DESCRIPTION OF THE DRAWING

In FIG. 2, the monoglobular gel-like particles of about 80 μm in average particle size are shown. In FIG. 3, the polyglobular gel-like particles, of which each particle is a collective body of several monoglobular gel-like bodies having each an average particle size of about 70 μm, are shown.

COMPARATIVE EXAMPLE 1

Figure 1:
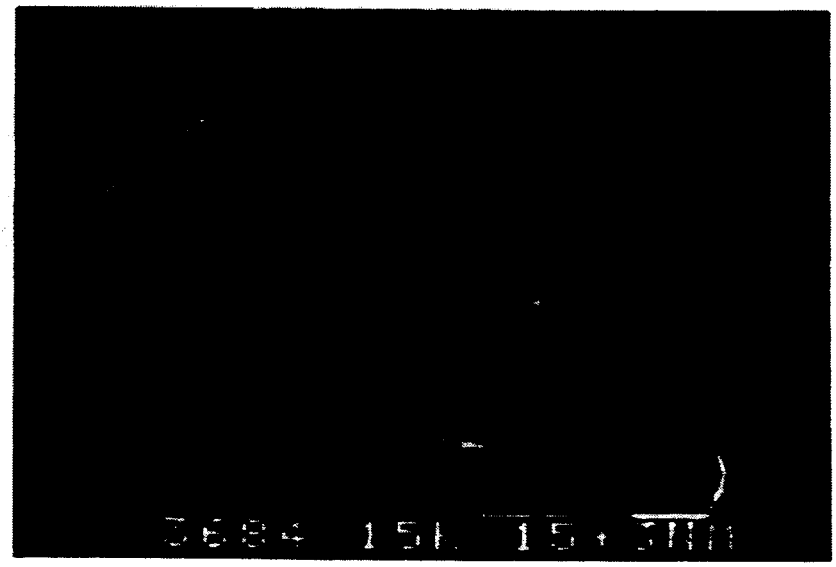
FIG. 1 of the accompanying drawings is a scanning type electron microscopic photograph ($\times 1,500$) showing the perspective view of the stretched filament as obtained in Example 1 at the cutting end. From this figure, the appearances of the side surface and the section of the stretched filament, i.e. the sectional flatness and the extended multi-grooves at the surface, can be well observed, and determination of the following physical properties are possible: sectional flatness, about 5.6; number of extended multi-grooves per 10 μm of average distance in normal direction to filament axis, about 7.
Figure 2:
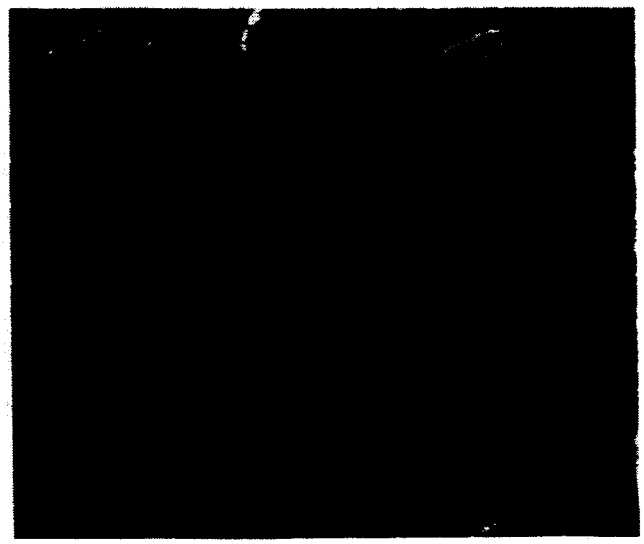
FIGS. 2 and 3 are enlarged microscopic photographs ($\times 250$) of the gel-like globules of polyethylene as obtained in Example 1.
Figure 3:
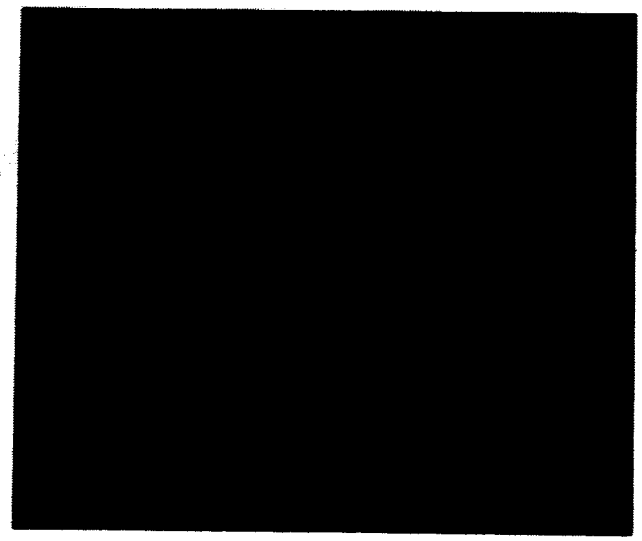
Figure 4:
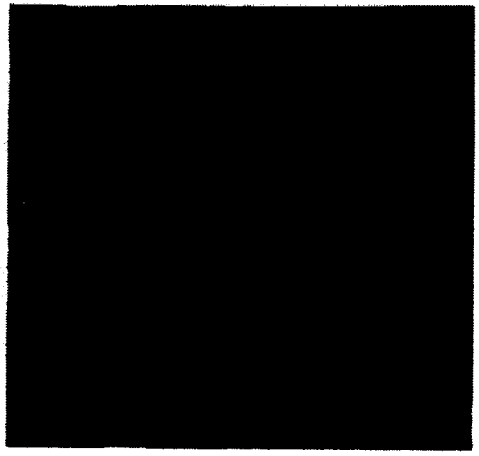
FIG. 4 is a polarized microscopic photograph ($\times 200$) of the monoglobular gel-like particles as obtained in Example 1. It clearly shows a Maltese cross configuration inherent to globular gel-like particles.

The same polyethylene powders as used in Example 1 were subjected to primary and secondary dissolution successively and respectively in the first and second tanks while stirring under nitrogen atmosphere for 48 hours to obtain a polyethylene solution having a polyethylene content of 3%.

The above obtained polyethylene solution was charged in a heated extruder hopper of a conventional gel-filament spinning apparatus as in Example 1, and spinning was carried out in the same manner as in Example 1, followed by taking up of the resulting gel-like filaments onto bobbins.

The solution extruded and discharged through a spinneret contained many air bubbles, and filament breakage was often produced during the spinning. Further, the viscosity of the extruded solution was fluctuated.

Stretching of the thus prepared filaments was carried out as in Example 1 but interrupted frequently due to filament breakage. The stretched filaments had denier deviation among monofilaments and in filament axis direction and showed a tensile strength of 22 g/d and an initial modulus of 480 g/d, which are much inferior to those of the stretched filaments as obtained in Example 1. Further, the molecular weight of polyethylene in the stretched filaments showed 1 remarkable decrease in comparison with that of polyethylene as the starting material.

COMPARATIVE EXAMPLE 2

On preparation of the gel-like material from the same decalin solution of polyethylene as used in Example 1, cooling to room temperature was carried out not gradually as in Example 1 but quickly in 30 minutes.

The thus obtained gel-like material in a spongy state was stirred strongly with a homomixer for a long time to break it into small pieces and then supplied to the extruder hopper of a conventional gel-filament spinning apparatus as in Example 1. Spinning was carried out in the same manner as in Example 1.

The gel-like material was sheared by the screw of the extruder so that decalin occluded therein was squeezed out and flowed back to the entrance of the extruder hopper. The solution extruded and discharged from the spinneret had a high and uneven concentration of polyethylene and could not be taken up onto bobbins.

EXAMPLE 2

Powders of polyacrylonitrile (viscosity average molecular weight, $3 \times 10^6$; average particle weight, $4.5 \times 10^{-3}$ mg) were added to dimethylformamide to make a polyacrylonitrile content of 7%, and the temperature was elevated up to 180° C. while stirring in the same manner as in Example 1 to make a solution.

The dimethylformamide solution was cooled overnight, whereby a gel-like material was obtained. The gel-like material contained some coarse gel-like particles in a film or particulate form of more than 1 mm in average particle size but almost all of them could be separated into fine gel-like particles, each having 1 mm or less in average particle size, by simple mechanical stirring. After elimination of coarse gel-like particles, the resulting gel-like material was stirred in a homomixer.

The gel-like globules of 1 mm or less in average particle size were collected from the resultant dispersion and subjected to microscopic observation. As a result, it was revealed that the gel-like globules comprise about 75% of monoglobular gel-like particles having an average particle size of 50 μm and containing 15% of polyacrylonitrile and 85% of dimethylformamide, and about 25% of polyglobular gel-like particles, of which each particle is a collective body of 2 to 15 monoglobular gel-like particles.

The gel-like globules of 1 mm or less in average particle size were added to dimethylformamide to make a polyacrylonitrile content of 7% and stirred at room temperature by the use of a homomixer to make a uniform dispersion of the gel-like globules.

The resultant dispersion was charged at room temperature in an extruder hopper of a conventional gel-filament spinning apparatus as in Example 1, in which the extruder was kept at 180° C. The resulting solution was extruded through a spinneret having 4 orifices, each orifice having a diameter of 0.8 mm and a length of 8 mm, with an extrusion rate of 6 g/min to make a gel-like filament. The temperatures of the spinning head and the spinneret were 186° C. and 180° C., respectively. The filaments thus extruded were discharged into a cooling solution of alcohol-dry ice of −40° C. provied several centimeters below the spinneret surface according to the air-gap spinning mode to make gel-like filaments.

Spinning was continued with good processability as in Example 1, and no filament breakage was produced during the spinning.

The resultant gel-like filament was then stretched with a high stretch ratio as in Example 1 to give a stretched filament of high strength and high modulus with good processability.

EXAMPLE 3

Polyvinyl alcohol (viscosity average molecular weight, about 600,000; polymerization degree, 15,000) prepared by saponification of polyvinyl acetate as obtained by bulk polymerization was dissolved in bis-beta-aminoethylamine to make a 2% concentration and then suspended and coagulated in methanol containing 5% bis-beta-aminoethylamine. The coagulants were collected by filtration to obtain a gel-like material in a particulate form having about 50 μm average particle size and occluding bis-beta-aminoethylamine in an amount of 18%.

The thus obtained gel-like particles occluding bis-beta-aminoethylamine were added to bis-beta-aminoethylamine to make a polyvinyl alcohol content of 4% and stirred at 40° C. to make a homogeneous solution.

The homogeneous solution was extruded through a spinneret having 24 orifices, each orifice having a diameter of 0.1 mm, with an extrusion rate of 1.2 g/min into a coagulation bath of methanol containing 5% bis-beta-aminoethylamine to make a gel-like filament. Spinning was effected well as in Example 1, and no filament breakage was produced during the spinning.

The thus obtained gel-like filament occluded bis-beta-aminoethylamine in a content of 18%, and the bis-beta-aminoethylamine was eliminated by washing with methanol.

The resultant gel-filament after washing was stretched at an elevated temperature with a high stretch ratio to give a stretched filament of 25 g/d in tensile strength, 700 g/d in initial modulus and 5% in break elongation with good processability.

EXAMPLE 4

Powders of polyethylene (viscosity average molecular weight, $2 \times 10^6$; average particle weight, $5 \times 10^{-5}$ mg) were mixed with decalin to obtain a uniform dispersion having a polyethylene content of 3%. The uniform dispersion was charged at room temperature in an extruder hopper of a conventional gel-filament spinning apparatus as used in Example 1, in which the extruder and the spinning head were kept respectively at 150° C. and 156° C. Spinning was carried out through a spinneret having 18 orifices, each orifice being 0.8 mm in diameter and 8 mm in length, with an extrusion rate of 20 g/min. The extruded solution was cooled with a conventional quenching apparatus to make a gel-like filament containing decalin. Spinning was continued for 30 hours with good processability and without filament breakage.

The stretched filament obtained by stretching the gel-like filament as prepared above showed a tensile strength of 43 g/d, an initial modulus of 1360 g/d and a break elongation of 5%.

COMPARATIVE EXAMPLE 3

Polyethylene powders (viscosity average molecular weight, $2\times 10^6$; average particle weight, $6\times 10^{-3}$ mg or $6\times 10^{-4}$ mg) were dispersed in decalin to make a dispersion having a polyethylene content of 3%. The dispersion was subjected to melt spinning as in Example 1. In case of polyethyene having an average particle weight of $6\times 10^{-3}$ mg, undissolved polyethylene powders were deposited on the wall surface of the screw of the spinning apparatus, and spinning became impossible immediately after the start of the operation. In case of polyethylene having an average particle weight of $6\times 10^{-4}$ mg, spinning could be carried out but the spun product was uneven in polymer concentration and frequent filament breakage was produced.

EXAMPLE 5 AND COMPARATIVE EXAMPLE 4

Powders of polyethylene (A) (viscosity average molecular weight, $1\times 10^5$; average particle weight, $4.2\times 10^{-5}$ mg) or powders of polyethylene (B) (viscosity average molecular weight, $3\times 10^5$; average particle weight, $3.5\times 10^{-5}$ mg) were dispersed in decalin to obtain a uniform dispersion having a polyethylene content of 3%. The dispersion was charged at room temperature into a screw-type spinning apparatus, and spinning was carried out as in Example 1. The resultant gel-like filament was stretched in the same manner as in Example 1 to give a stretched filament.

The stretched filament made of polyethylene (A) showed a tensile strength of 26 g/d (Comparative Example 4), while that made of polyethylene (B) showed a tensile strength of 41 g/d (Example 5).

EXAMPLE 6

Fine powders of polyacrylonitrile (viscosity average molecular weight, $3.0\times 10^6$; average particle weight, $3\times 10^{-3}$ mg) were dispersed in dimethylformamide to make a uniform dispersion having a polyacrylonitrile content of 7%. The uniform dispersion was charged at room temperature in an extruder hopper of a screw-type melt spinning apparatus, of which the extruder was kept at 180° C. Spinning was carried out through a spinneret having 4 orifices, each orifice being 0.8 mm in diameter and 8 mm in length, with an extrusion rate of 6 g/min to make a filament in a solution state. The temperatures of the spinning head and the spinneret were 186° C. and 180° C., respectively. The filament thus extruded was cooled in a cooling solution of alcohol-dry ice of −40° C. according to the air-gap spinning mode to make a gel-like filament.

The spinning was effected with good processability and without filament breakage. The obtained gel-like filaments were uniform and could be stretched without any difficulty.

What is claimed is:

1. A method of preparing a stretched polymeric material of high tensile strength and high modulus, which comprises the steps of:

preparing gel-like globules (a) of a synthetic polymer having a solvent occluded therein and having an average particle size of not more than 1 mm by dissolving the synthetic polymer in the solvent and cooling the resulting solution, or preparing fine powders (b) of a synthetic polymer having an average particle weight of not more than $5\times 10^{-5}$ mg per particle in a solvent by dissolving the synthetic polymer in the solvent, cooling the resulting solution and lyophilizing the produced gel-like globules, said synthetic polymer having an average molecular weight of not less than $3\times 10^5$;

preparing a solution or dispersion, for shaping, from the gel-like globules (a) or the fine powders (b) with a solvent, said solution or dispersion being heated to retain said solution and convert the dispersion to a solution;

shaping eight solution into filaments or films;

cooling the shaped filaments or films to produce gel-like filaments or gel-like films, each containing solvent; and stretching the gel-like filaments or gel-like films at a high stretch ratio of a at least 2, resulting in a stretched polymeric material having a tensile strength of not less than 30 g/d and an initial modulus of not less than 800 g/d.

2. The method according to claim 1, wherein the gel-like globules (a) comprise monoglobular gel-like particles or their mixture with polyglobular gel-like particles.

3. The method according to claim 2, wherein the monoglobular gel-like particles have an average particle size of 10 to 200 μm.

4. The method according to claim 2, wherein the polyglobular gel-like particles are each a collective body of 2 to 20 monoglobular gel-like particles.

5. The method according to claim 1, wherein the gel-like globules (a) or the fine powders (b) are dissolved or dispersed homogeneously in a solvent, the resultant solution or dispersion is supplied to the hopper of an extruder for spinning or film-forming at a temperature of not higher than the swelling temperature of the gel-like globules, the supplied solution or dispersion is heated in the extruder so as to dissolve the gel-like globules in the solvent resulting in the solution for shaping.

6. The method according to claim 1, wherein the shaped filaments or films are subjected continuously to stretching at the first stage.

7. The method according to claim 1, wherein the synthetic polymer is at least one chosen from polyolefin, polyacrylonitrile fluoride, polyvinyl alcohol, polyamide and polyester.

8. The method according to claim 7, wherein the synthetic polymer is polyethylene, polypropylene, polyvinyl alcohol or polyacrylonitrile.

9. The method according to claim 8, wherein the synthetic polymer has an average molecular weight of not less than $1\times 10^6$.

10. The method according to claim 7 wherein the synthetic polymer has an average molecular weight of not less than $1\times 10^6$.

11. The method according to claim 1, wherein the synthetic polymer has an average molecular weight of not less than $1\times 10^6$.

* * * * *